United States Patent [19]

Karpal

[11] 4,191,807
[45] Mar. 4, 1980

[54] AIRCRAFT BATTERY

[75] Inventor: David L. Karpal, Redlands, Calif.

[73] Assignee: Teledyne Industries, Inc., Los Angeles, Calif.

[21] Appl. No.: 929,345

[22] Filed: Jul. 31, 1978

[51] Int. Cl.$^2$ ............................................. H01M 2/02
[52] U.S. Cl. ..................................... 429/176; 429/185
[58] Field of Search ......... 429/176, 174, 175, 177–182, 429/148, 185, 163, 164, 96, 98, 100

[56] References Cited

U.S. PATENT DOCUMENTS

| | | | |
|---|---|---|---|
| 1,080,852 | 12/1913 | Snyder et al. | 429/96 |
| 1,651,226 | 11/1927 | Pearson | 429/176 |
| 2,379,189 | 6/1945 | Rupp | 429/177 X |
| 3,816,181 | 6/1974 | Buckethal | 429/176 X |

FOREIGN PATENT DOCUMENTS 617249  2/1949  United Kingdom ................... 429/176

Primary Examiner—Anthony Skapars
Attorney, Agent, or Firm—Reagin & King

[57] ABSTRACT

An aircraft battery having a polypropylene casing for receiving the lead plates and acid therein, the polypropylene casing is configured for fitting within an aluminum housing in close fitting relation, the cover portion of the casing having a peripheral lip or ridge in close, spaced relation with the interior of the aluminum housing for receiving a silicon adhesive sealant for bonding the casing to the interior of the housing. A fence or ridge portion on the cover, in conjunction with the interior of the housing, encircles the terminal conductors of the battery for receiving an epoxy for providing mechanical rigidity as well as sealing at the terminal portion of the battery.

6 Claims, 5 Drawing Figures

AIRCRAFT BATTERY

BACKGROUND OF THE INVENTION

The background of the invention will be discussed in two parts:

1. Field of the Invention

This invention relates to aircraft batteries, and more particularly to a lead-acid aircraft battery encased in an aluminum housing.

2. Description of the Prior Art

In prior art aircraft batteries, conventionally a lead-acid battery is placed within an aluminum housing having side walls slightly greater than the overall height of the battery casing. Each of the cell apertures includes a neck portion extending above the battery casing cover, and for sealing the battery casing within the aluminum housing, in prior art techniques, the casing cover is flooded with an epoxy to the edge of the neck or sleeve of the cell aperture, thus providing an epoxy layer completely covering the battery casing cover.

In such prior art aircraft batteries, the casing of the battery is formed from a thick-walled carbon impregnated rubber composition configured for snug fitting relation within the aluminum housing, and an aluminum cover fitted over the aluminum housing to thereby provide an integral unit. The selection of materials for the casing and housing is usually made on the basis of coefficient of thermal expansion of the two materials, it being desirable that the coefficients be identical if not substantially similar.

However, with such prior art aircraft batteries, due to the extreme temperature environment within which the battery must operate, separation of the epoxy from the housing as well as the casing from the epoxy resulted, thereby endangering the mechanical and electrical integrity of the airplane system as a whole. While the coefficients of thermal expansion of the carbon impregnated rubber of the casing and the aluminum housing are generally similar, it is believed that this separation results from thermal shock or the like. With a generally thin walled aluminum, that is, thin as contrasted to the thick wall of the casing, it appears that the thermal conductivity of the aluminum is able to absorb sudden and extreme variations in temperature while the carbon impregnated rubber composition acted as a heat sink, thereby resulting in separation.

Another attendant disadvantage to the conventional thick walled carbon impregnated rubber casing is the addition of weight to the aircraft, the rubber casing of a typical aircraft battery weighing approximately 3.6 kilograms.

It is an object of the present invention to provide a new and improved lead-acid aircraft battery.

It is another object of the present invention to provide a new and improved light weight lead-acid aircraft battery.

It is still another object of the present invention to provide a new and improved sealing arrangement for securing the casing of a lead-acid aircraft battery to the aluminum housing thereof.

SUMMARY OF THE INVENTION

The foregoing and other objects of the invention are accomplished by providing a lead-acid aircraft battery having a relatively thin walled molded polypropylene battery casing and cover sealed into one piece, the cover including a peripheral ridge adjacent the edge thereof configured for being in spaced proximate relation to the interior of a polyvinylchloride coated aluminum housing for receiving the casing therein in snug relation with the cover thereof spaced from the top opening of the housing. The cover also contains a fence or ridge portion of greater height, the fence in combination with the adjacent side wall of the interior of the housing forming a compartment for receiving epoxy for encapsulating the terminals of the battery to provide electrical and mechanical integrity. A silicon adhesive is flowed into the spacing between the peripheral ridge and the interior wall of the housing for adhesively sealing and bonding the casing to the housing.

Other objects, features, and advantages of the invention will become apparent from a reading of the specification when taken in conjunction with the drawings in which like reference numerals refer to like elements in the several views.

DESCRIPTION OF THE PREFERRED EMBODIMENT

Figure 1:
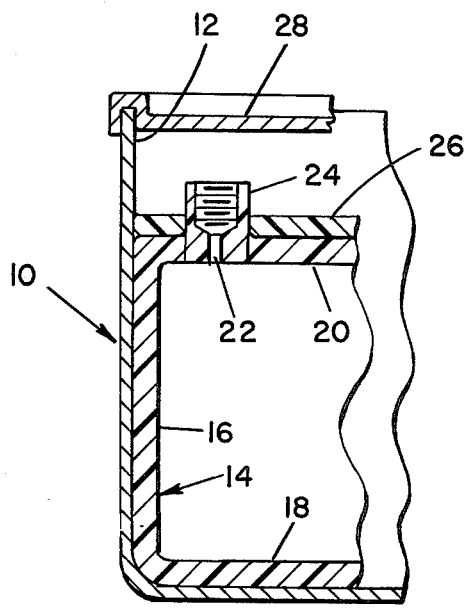
FIG. 1 is a partial cross sectional view of a prior art lead-acid aircraft battery.

Referring now to the drawings and more particularly to FIG. 1, there is shown, in cross section, a portion of a prior art lead-acid aircraft battery, the battery including an aluminum housing generally designated 10 having an open top 12 being generally rectangular in form for receiving therein a battery casing generally designated 14, the battery casing 14 having side walls 16, a bottom 18 and a top cover 20, all portions of the casing 14 being formed of a thick-walled carbon impregnated rubber configured for a snug fit within the housing 10 with the side walls 16 and bottom 18 thereof in close abutting relation with the adjacent side walls and bottom of the housing 10. For ease of illustration, the lead plates of the battery have been removed, it being understood that in conventional practice, each cell of the battery includes a cell aperture 22 passing through a neck 24 for introducing the acid into the battery after assembly. The neck 24 is integrally formed with the cover portion 20 of the casing 14 and extends above the plane of the cover 20 thereof. In such prior art batteries, for securing the casing 14 within the housing 10, after the positioning of the casing 14 within the housing 10, an epoxy layer 26 is applied to the outer surface of the top or cover portion 20 of the casing 14 by flooding the space therein until the upper level of the layer of epoxy 26 is adjacent the upper edge of the neck 24, the epoxy layer 26 extending to the adjacent interior surface of the housing 10 for thereby sealing the casing 14 within the housing 10. With such assemblies, the epoxy layer could be as thick as ½ inch thereby adding additional weight to the overall assembled unit. As previously mentioned, in a conventional battery utilizing carbon impregnated rubber and an overall epoxy layer 26, the weight of the casing 14 itself could be typically 3.6 kilograms with the additional weight of the epoxy layer. The overall assembled unit is then typically provided with an aluminum cover 28 which encloses the open end 12 of the housing 10, the cover 28 generally being secured by suitable fastening means such as screws or the like.

Figure 5:
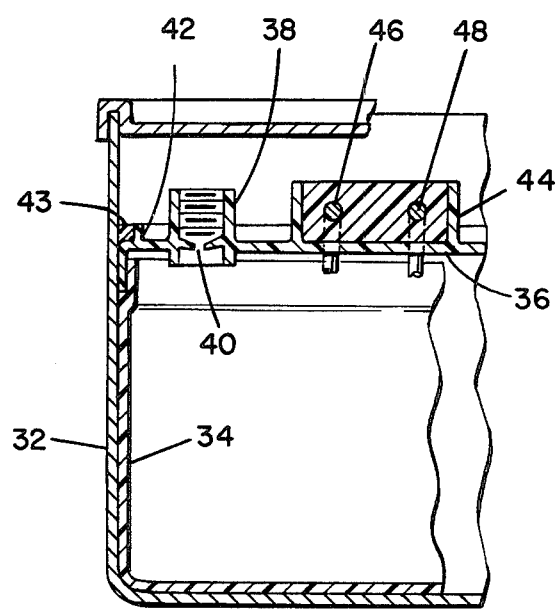
FIG. 5 is a partial cross sectional view taken generally along line 5—5 of FIG. 4.
Figure 2:
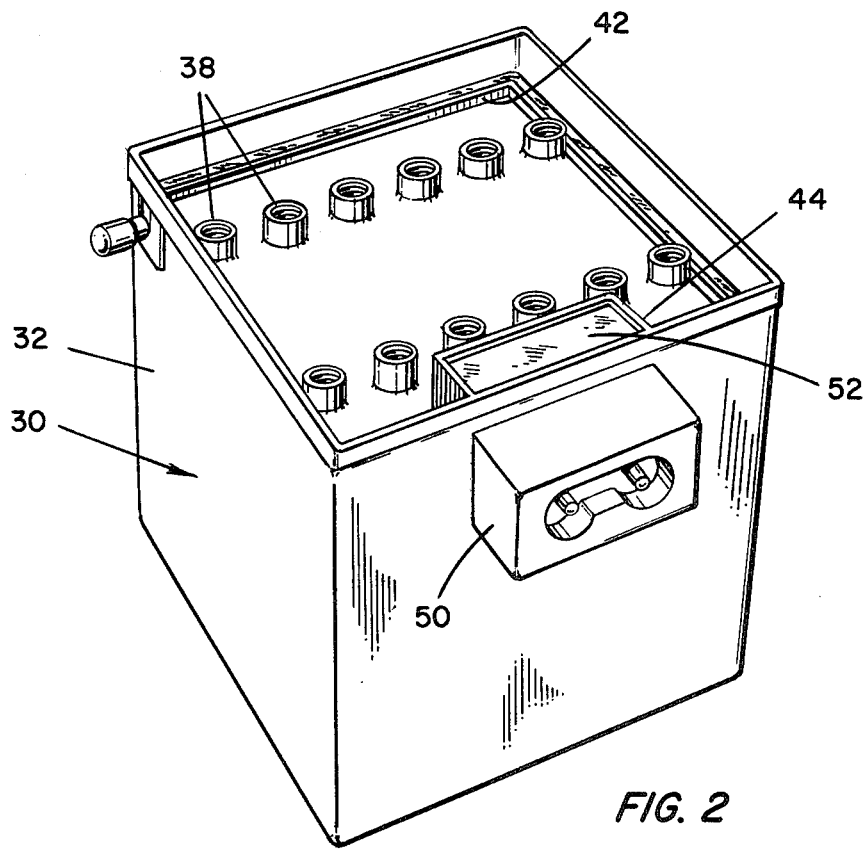
FIG. 2 is a perspective view of the aircraft battery according to the invention.
Figure 3:
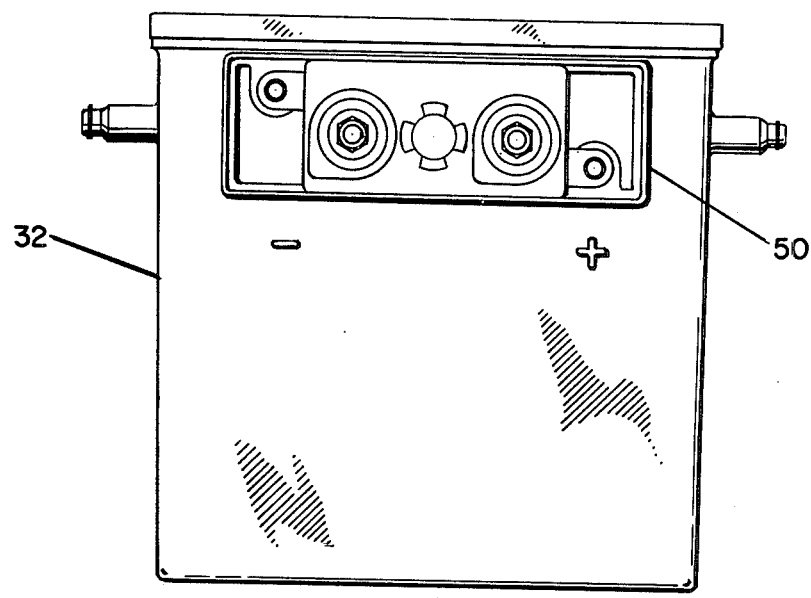
FIG. 3 is a front elevational view of the aircraft battery of FIG. 2.
Figure 4:
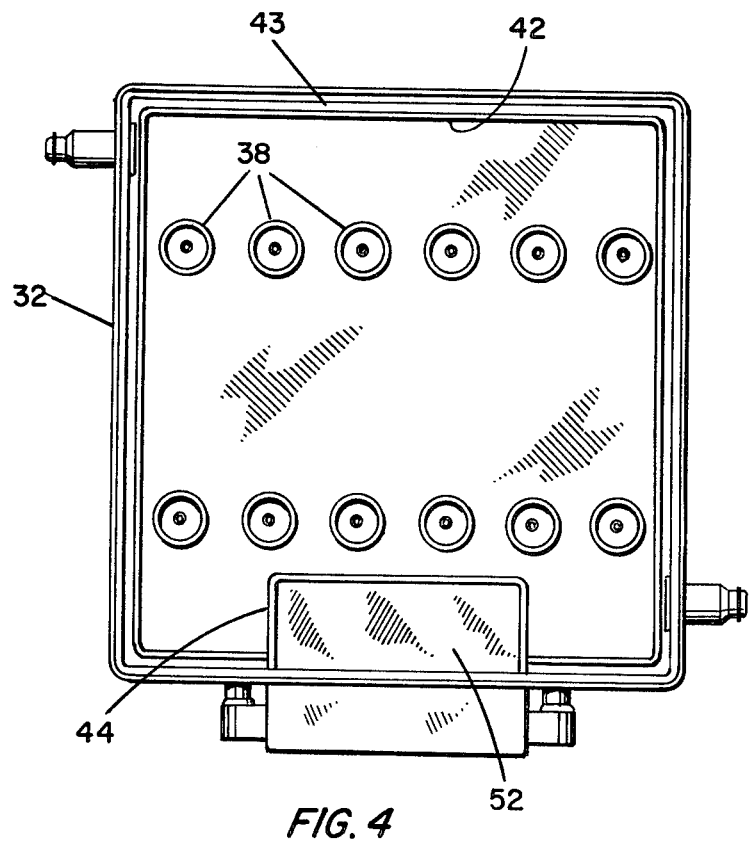
FIG. 4 is a top plan view of the aircraft battery of FIG. 2 without the cover member of the housing.

Referring now to FIG. 2, there is shown a battery unit generally designated 30 according to the invention, the aircraft battery unit 30 having an outer aluminum housing 32 configured for receiving therein a casing 34 (see also FIGS. 3–5), the casing 34 being formed of a generally thin-walled polypropylene composition. The casing 34 may be molded and a molded casing cover 36 suitably secured thereto such as by ultrasonic welding or sealing to form a container for receiving the lead plates (not shown). The cover 36 is likewise formed of a polypropylene material of relatively thin cross section with integrally molded necks 38 having cell apertures 40 extending therethrough.

The cover 36 is also provided with a peripheral barrier or ridge portion 42 adjacent the edge thereof, and with the casing 34 and cover 36 fitted within the housing 32, the ridge 42 is in spaced proximate relation to the interior surface of the housing 32. The housing 32 may be additionally provided with a polyvinylchloride coating for further protection of the assembled unit.

Once the battery casing 34 is positioned within the housing 32, a silicon sealant or adhesive bead 43 is inserted into the channel formed between the ridge 42 and the adjacent housing 32 side wall to thereby seal the assembled battery container within the housing 32, thereby resulting in a minimal amount of sealant required for assembly, resulting in a positive bonding and sealing arrangement as well as reducing the amount and consequently the weight of sealant required. This, in conjunction with the thin-walled polypropylene material utilized for the casing 34 and cover 36 results in a substantial reduction of weight. For example, the conventional battery referred to above as having a weight of 3.6 kilograms for the carbon impregnated rubber casing 14 thereof, when replaced by a casing 34 and cover 36 of the same dimensions results in an overall weight reduction of approximately 2.6 kilograms, the casing 34 and cover 36 in polypropylene material weighing, in contrast, only approximately one (1) kilogram.

To ensure the mechanical integrity as well as the electrical integrity of the terminal portion of the battery, a ridge or fence 44 of generally C-shaped configuration is formed integrally with the upper surface of the cover 36 adjacent one end thereof or generally surrounding the electrical terminals 46 and 48 which, as shown in FIG. 2, ultimately bend outwardly to pass through a terminal junction box 50 formed in the side of housing 30 for ultimate connection to the electrical system of the aircraft.

As can be seen in FIGS. 2–5, the fence 44 has the open end thereof abutting against the interior adjacent side wall of housing 32 for forming an open-topped compartment having an overall configuration for generally surrounding the terminals 46 and 48. Into this compartment, an epoxy layer 52 is inserted for suitably encapsulating the terminals 46 and 48 to thereby provide structural strength as well as electrical integrity at the terminal portion of the assembled unit. The total amount of epoxy utilized within the compartment formed by fence 44 is significantly less than the amount of epoxy previously required when "flooding" the battery casing with epoxy as in the prior art, notwithstanding the increased height of the fence 44, which rises above the terminal ends of the necks 38 of the cover 36. This additional height provides additional structural strength to the terminal area.

In addition to the consequent weight savings, the utilization of a thin-walled polypropylene material for the casing 34 which is in close abutting relation to the interior surfaces of the housing 32 enables the casing 34 to readily dissipate rapid heat changes to which the housing 32 may be subject when used in the aircraft. Furthermore, the silicon adhesive bead 43 effectively seals and bonds the casing 34 and cover 36 combination to the interior housing 32 resulting in virtually no separation, thus resulting in a more reliable lead-aircraft battery assembly of significantly reduced weight. While there has been shown and described a preferred embodiment, it is to be understood that various other adaptations and modifications may be made within the spirit and scope of the invention.

What is claimed is:

1. In an aircraft battery, the combination comprising:
a generally box-like aluminum housing;
a battery casing of polypropylene material configured for fitting within said housing in close fitting relation therein with the top of said casing being recessed below the open end of said housing; and
means for bonding said casing within said housing said casing includes a cover portion having a substantially peripheral ridge in close spaced relation with the interior of said housing and said means for bonding includes a silicon composition sealant in the space between said ridge and said housing.

2. In an aircraft battery, the combination comprising:
a generally box-like aluminum housing;
a battery casing of polypropylene material configured for fitting within said housing in close fitting relation therein with the top of said casing being recessed below the open end of said housing, said casing including a cover portion having a substantially peripheral ridge in close spaced relation with the interior of said housing and including an integrally formed generally C-shaped fence portion generally perpendicular to said cover with the open end thereof in abutting relation with the interior of said housing to form a compartment generally surrounding the terminals of the battery and an epoxy inserted in said compartment;
and means for bonding said casing within said housing including a silicone composition sealant in the space between said ridge and said housing.

3. The combination according to claim 2 wherein said aluminum housing is polyvinylchloride coated.

4. In an aircraft battery, the combination comprising:
a battery casing having a cover portion;
an aluminum housing configured for receiving said casing therein in close fitting relation with said cover portion being spaced from the open end of said housing;
a substantially peripheral ridge integrally formed with said cover portion with said ridge being in close spaced relation with the interior of said housing for receiving a sealant.

5. The combination according to claim 4 further including a silicon composition sealant in the space between said ridge and the interior of the housing.

6. In an aircraft battery, the combination comprising:
a battery casing having a cover portion;

an aluminum housing configured for receiving said casing therein in close fitting relation with said cover portion being spaced from the open end of said housing;
a substantially peripheral ridge integrally formed with said cover portion with said ridge being in close spaced relation with the interior of said housing for receiving a sealant;
a silicone composition sealant in the space between said ridge and the interior of the housing; and,
electrical terminals extending through said cover portion adjacent one edge thereof and said cover portion including an integral generally C-shaped fence portion extending generally perpendicular thereto, the open end of said fence portion abuttingly engaging the interior of said housing to form a compartment generally surrounding said terminal, said compartment being configured for receiving epoxy to encapsultate said terminals.

* * * * *